(12) United States Patent
Peters et al.

(10) Patent No.: US 6,333,957 B1
(45) Date of Patent: Dec. 25, 2001

(54) TOOL KIT FOR FABRICATING, INSPECTING AND HANDLING A NUCLEAR FUEL BUNDLE

(75) Inventors: William C. Peters, Wilmington; David G. Smith, Leland; Edward G. Apple, Jr., Wilmington, all of NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/440,513

(22) Filed: Nov. 15, 1999

(51) Int. Cl.[7] .................................................. G21C 3/322
(52) U.S. Cl. ........................ 376/444; 376/261; 376/446
(58) Field of Search ................................... 376/261, 444, 376/446

(56) References Cited

U.S. PATENT DOCUMENTS

| | | | |
|---|---|---|---|
| 4,265,010 | * 5/1981 | Doss et al. | 29/402.01 |
| 4,659,537 | * 4/1987 | Beuneche et al. | 376/261 |
| 4,876,063 | * 10/1989 | Johansson | 376/444 |
| 5,174,949 | * 12/1992 | Johansson | 376/439 |
| 5,481,579 | * 1/1996 | Johansson et al. | 376/446 |
| 5,608,768 | * 3/1997 | Matzner et al. | 376/451 |
| 5,809,101 | * 9/1998 | Dunlap et al. | 376/446 |
| 5,914,995 | * 6/1999 | Meier et al. | 376/444 |
| 5,978,430 | * 11/1999 | Peters et al. | 376/258 |

* cited by examiner

Primary Examiner—Michael J. Carone
Assistant Examiner—John Richardson
(74) Attorney, Agent, or Firm—Nixon & Vanderhye

(57) ABSTRACT

A tool kit for adjusting the angular orientation of water rods about respective axes in a nuclear fuel bundle includes a washer wrench, socket, orientator wrenches, orientator gauges and an orientator cap. The washer wrench has opposed jaws having parallel surfaces and reliefs at junctures between the surfaces and the base of the jaws to inhibit rounding off corners of tie bars connected to the water rods. The socket has a corresponding D-shaped recess as the tie bar ends to facilitate rotational adjustment thereof. Orientator wrenches have witness notches for aligning the flats of the tie bars. The orientator gauges comprise a series of gauge bodies each having a pair of axially parallel openings with stepped margins to the openings such that one opening is axially offset from the margin defining the entrance to the other opening. The orientator cap has complementary-shaped openings for receiving the upper ends of the tie bars to maintain the orientation of the tie bars and water rods during shipment of the fuel bundle.

23 Claims, 8 Drawing Sheets

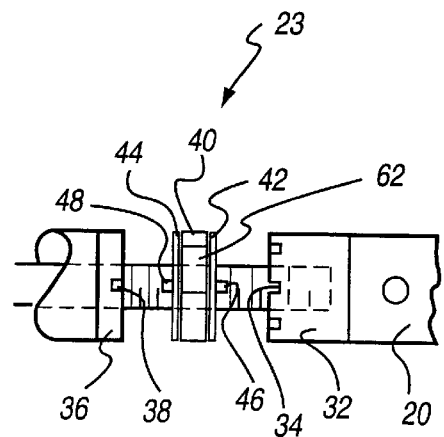
Fig. 2
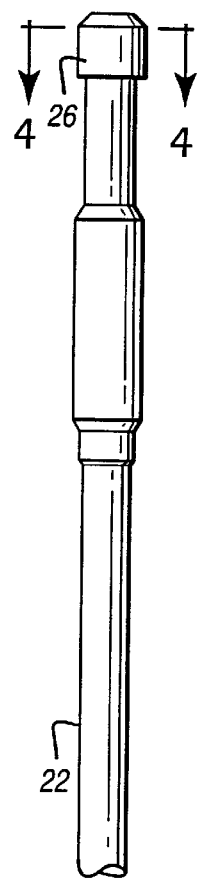
Fig. 3
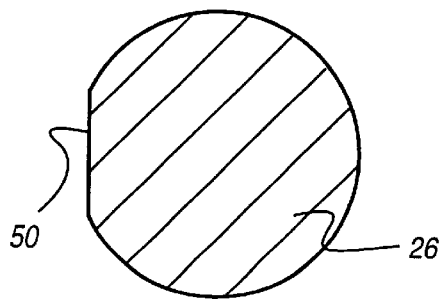
Fig. 4
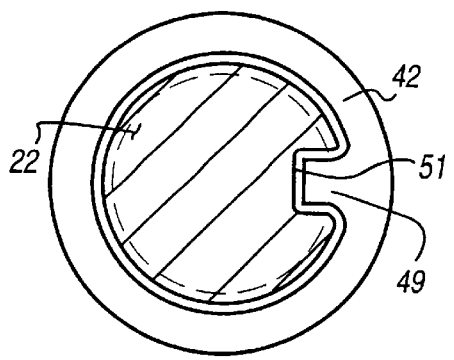
Fig. 5
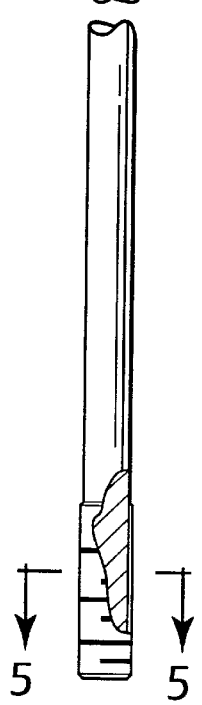

Fig. 7
Fig. 8
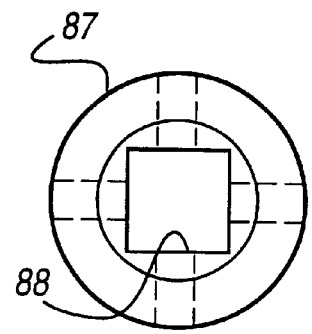
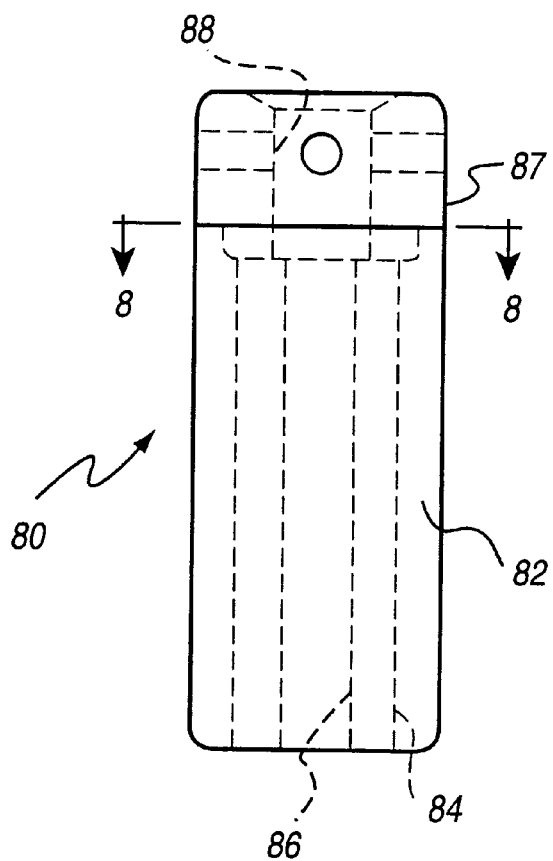
Fig. 9
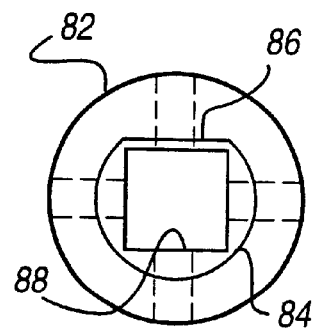

TOOL KIT FOR FABRICATING, INSPECTING AND HANDLING A NUCLEAR FUEL BUNDLE

BACKGROUND OF THE INVENTION

The present invention relates to nuclear fuel bundles of a type having water rods serving as supports between a lower tie plate and an upper tie plate and particularly relates to a tool kit for fabricating, inspecting and handling the nuclear fuel bundle.

In a recent nuclear fuel bundle design by the assignee of the present invention, mechanical support for the fuel bundle in an unchanneled condition is provided by a pair of central water rods connected to the lower tie plate rather than by conventional tie rods. The water rods are typically threaded and screwed into the lower tie plate and tie bars are fixed at the upper ends of the water rods for attachment to a lifting tool. The upper ends of the tie bars terminate in heads having one or more flats designed for proper orientation and fit into similarly machined complementary openings in the lift tool. The tie bar heads have a D-flat configuration, although other non-circular cross-sectional configurations can be utilized. Preferably, at least one flat is used.

BRIEF SUMMARY OF THE INVENTION

In this new fuel bundle, the two water rods lie in close proximity to one another in the fuel bundle. As a consequence, their relative lengths from the face of the lower tie plate to the underside of the tie rod ends are required to meet tight tolerances. For example, the length tolerance for the pair of water rods in a particular bundle preferably lies within 0.020 inches of one another to prevent undesirable tilting of the bundle during vertical handling or transport. The water rod assemblies are adjustable in length. This is accomplished by providing for relative axial movement of the water rod and the tie bar which, when adjusted, provide a water rod assembly of fixed predetermined length. To adjust the length, however, it is necessary to first rotate the water rod assembly to engage the threaded lower end plug of the water rod into the lower tie plate and then thread the tie bar into the water rod. The adjustment is further complicated by the requirement for at least one tabbed water rod assembly. That is, at least one water rod assembly requires a plurality of generally radially projecting tabs at axially spaced positions therealong for engagement with the spacers of the fuel bundle whereby the tabs prevent the spacers from disengaging from the water rod assemblies and sliding up or down the assemblies. These tabs lie only on one side of the water rod assembly and must lie in a predetermined orientation in final assembly. This requirement enables adjustment of the water rod in only one turn increments. Thus, the first adjustment to the overall length of the water rod assembly can be accomplished by a rotation of the water rod within a single rotation so that the water rod is one turn or less from bottoming out on the lower tie plate. The secondary adjustment of the tie bar is also restricted to a minimum of a single rotation because in final position, the D-flat on the upper end of the tie bar must be in a designated fixed rotational orientation. Additionally, the threads at the end plugs of the water rods and the lower ends of the tie bars are of different pitch. Consequently, by mutual adjustment of the water rod and tie bar, the tabbed water rod length can be set within a specified range, for example, 0.040 inches.

More particularly, the adjustment of the orientation of the tie rod and water rod relative to one another involves first rotating a threaded washer at the junction of the tie rod and water rod and moving a lower axially tabbed lock washer from locking relation with an end plug at the upper end of the water rod. Thus, by releasing the threaded washer and rotating it upwardly along the tie bar, the tie bar can be screwed farther into the upper water rod end plug by rotating it at least one full turn or multiples thereof before the lower lock washer is reseated in the water rod upper end plug and the threaded washer is tightened against it. Likewise, if the tie rod is to be rotated out of the upper water rod end plug to lengthen the water rod assembly, the threaded washer is threaded down on the tie bar. To accomplish this, the threaded washer must first be raised to permit the lower lock washer's axial tab to disengage from the upper water rod end plug.

The adjustment in the lengths of the water rod assemblies requires with respect to the tabbed water rod setting the length within a predetermined range, i.e., ±0.040 inches, and within one turn of bottoming out on the lower tie plate. It is also necessary to properly orient the water rod tabs and the tie bar D-flats. With respect to setting the length of the untabbed water rod, it is necessary to adjust its length within the predetermined tolerance, i.e., ±0.040 inches and also to set its length within a predetermined tolerance, e.g., ±0.020 inches of the tabbed water rod assembly length. It is also necessary to properly orient the tie bar D-flat. Special tools and gauges are therefore necessary to accomplish these actions and in accordance with a preferred embodiment of the present invention are provided as part of a tool kit. The tools and gauges of the tool kit include a socket, a flat orientator wrench, a threaded washer wrench, orientator gauges, orientator cap and a tie bar simulator. The first five tools and gauges are used in setting and maintaining the lengths and orientation of the water rods. The last device, i.e., the tie bar simulator is used in checking the alignment of the D-flat holes in the lift bars and lift tools.

The tools and gauges of the tool kit overcome significant problems in fabricating and handling the new fuel bundle design. For example, problems associated with locking and unlocking the threaded washer especially in a bundle with some of the fuel rods installed, rotation of the tie bars to adjust their lengths and orientation of the water rod tabs and the tie bar D-flats in a bundle where some or all of the fuel rods installed are overcome by the present invention. Additionally, the tool kit provides tools and gauges for checking the alignment of the two tie bar D-flat ends over maximum, minimum and nominal dimensions, maintaining the relative orientation of the tie rod D-flats during handling and shipping and checking the orientation of the machined D-flat holes in the lift bars and tools prior to shipment.

In a preferred embodiment according to the present invention, there is provided a tool kit for adjusting the length of a water rod assembly in a nuclear fuel bundle having a lower end plug for threaded engagement in a lower tie plate, the water rod assembly including a pair of water rods, a pair of tie bars having flats at upper ends thereof and releasable locking subassemblies for respectively securing the tie bars and water rods to one another, forming joints therebetween, comprising first and second gauges each having a gauge body with first and second openings generally complementary in shape to the respective upper ends of the tie bars having the flats, the openings having parallel axes, margins of each gauge body defining the openings being offset from one another in the direction of the axes, the openings of the second gauge being reduced relative to the openings in the first gauge body whereby the angular orientation of the water rods about their respective axes is adjustable upon application of the first and second gauges to the tie rods.

In a further preferred embodiment of the present invention, there is provided a tool kit for adjusting the length of a water rod assembly in a nuclear fuel bundle having a lower end plug for threaded engagement in a lower tie plate, the water rod assembly including a pair of water rods, a pair of tie bars having flats at upper ends thereof and releasable locking subassemblies for respectively securing the tie bars and water rods to one another forming joints therebetween. The tool kit comprises a pair of wrenches having wrench heads including openings respectively complementary in shape to the flats at the upper ends of the tie bars and reference points on the wrench heads for alignment with one another upon engagement of the tie bar upper end in the wrench head openings to align the water rod assemblies with one another rotationally about their respective axes; and at least one gauge having a gauge body with first and second openings generally complementary in shape to the respective upper ends of the tie bars having the flats, the openings having parallel axes, margins of the gauge body defining the openings being offset from one another in the direction of the axes whereby angular orientation of the water rods about their respective axes is adjusted.

BRIEF DESCRIPTION OF THE DRAWINGS

FIG. 2 is a fragmentary side elevational view illustrating the assembly of the tie bar and water rod at a juncture therebetween;

FIG. 3 is a side elevational view with parts broken out and in cross-section of a tie bar;

FIGS. 4 and 5 are cross-sectional views thereof taken generally about on lines 4—4 and 5—5 respectively in FIG. 3, with FIG. 5 additionally illustrating a lock washer about the threaded end of the tie bar;

FIG. 7 is a side elevational view of a socket forming part of the tool kit of the present invention;

FIG. 8 is a cross-sectional view of the socket taken about on line 8—8 in FIG. 7;

FIG. 9 is a bottom plan view of the socket of FIG. 7;

DETAILED DESCRIPTION OF THE INVENTION

Figure 1:
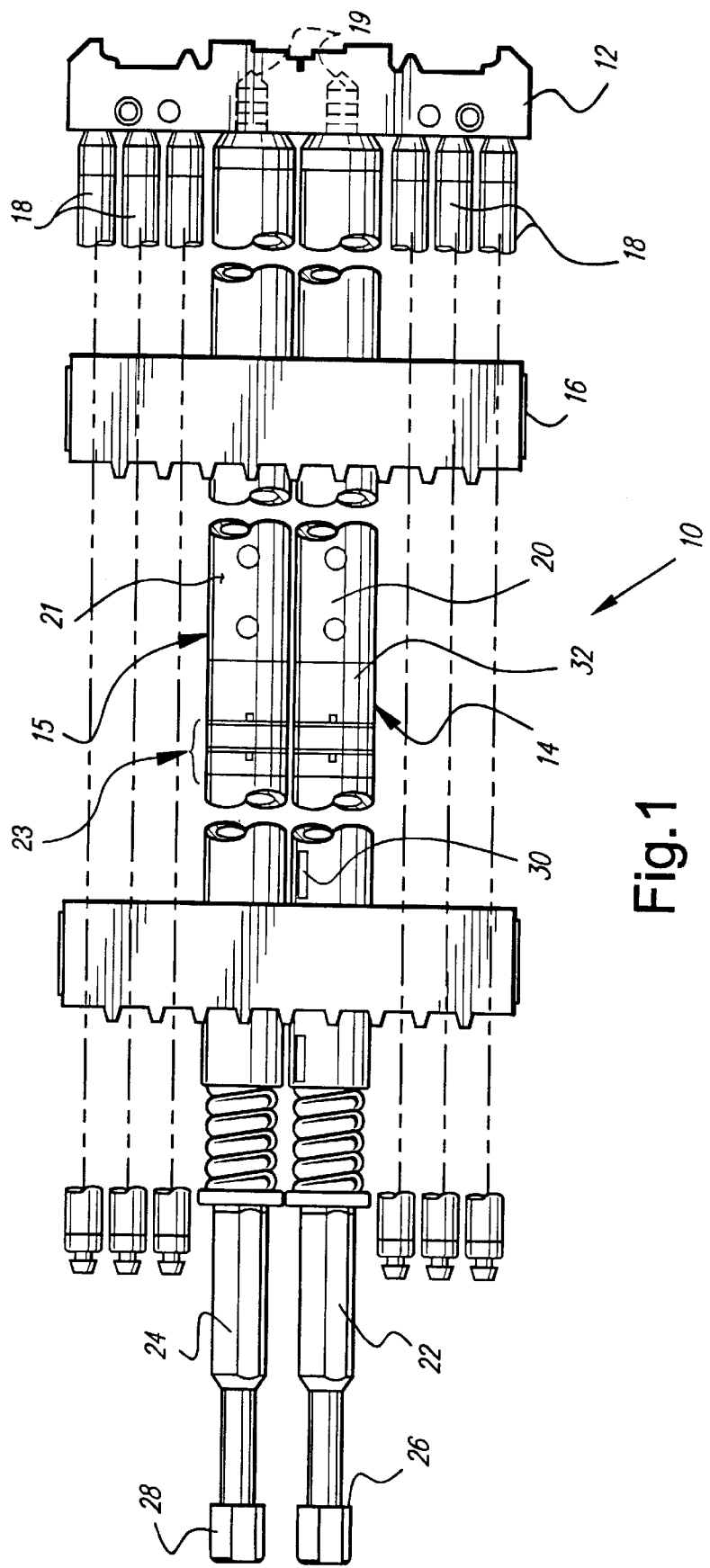
FIG. 1 is a side elevational view of an assembled nuclear fuel bundle lying in horizontal position with parts broken out for clarity.

Referring now to the drawings, particularly to FIG. 1, there is illustrated a schematic representation of a nuclear fuel bundle generally designated 10 comprised of a lower tie plate 12, a pair of water rod assemblies 14 and 15 secured at their lower ends to the tie plate 12, spacers 16 secured to the water rod assemblies 14 and 15 at spaced positions therealong and fuel rods 18 received through openings in the spacers 16 and secured to the lower tie plate 12. Water assemblies 14 and 15 each have threaded lower end plugs 19 for threaded reception in complementary threaded openings in the tie plate 12.

The water rod assemblies 14 and 15 are each comprised of essentially two sections, lower water rods 20, 21, respectively, and tie bars 22 and 24. The water rods 20 and 21 and the tie bars 22 and 24 are secured to one another in a length adjustable manner such that the lengths of the water rod assemblies lie within a predetermined range, i.e., on the order of 0.040 inches. As also noted, the adjustment in length of each water rod assembly requires particularly shaped parts, for example, a threaded washer 40 in FIG. 2 having a pair of opposite flats, and upper ends of the tie bars 22 and 24 having heads 26 and 28 which are in a D-shaped configuration. While the D-shaped configuration is used herein as a representative example of the shape of the upper end heads of the tie bars, it will be appreciated that other non-circular shapes, for example, multiple flats, can be employed. Additionally, one of the water rod assemblies is a tabbed rod configuration. For example, the water rod assembly 14 has radially projecting tabs 30 for engaging above and below the various spacers. The other water rod assembly 15 is an untabbed assembly.

Releasable locking subassemblies, generally indicated 23 in FIGS. 1 and 2, are provided for respectively securing the tie bars and water rods to one another forming joints therebetween. Referring to FIGS. 1 and 2, the lower end of each tie bar 22 and 24 is threaded and has an axially extending slot 51 in FIG. 5 extending along one side. The upper end of the water rod 20 has an end plug 32 complementarily threaded to the lower end of the tie bar 22. The upper end of the end plug 32 includes a plurality of equally spaced, radially extending slots 34, illustrated in part in FIG. 2. At the lower end of the tie bar 22, there is provided a sleeve cap 36 having a radially extending slot 38. Between the end plug 32 and sleeve cap 36, there is provided a threaded washer 40 and a pair of lock washers 42 and 44. Lock washer 42 has a raised axially projecting portion 46, e.g., a tab, along a radius thereof while lock washer 44 similarly has a raised axially projecting portion 48. Each lock washer has a radially inwardly extending projection or tab 49 for engaging along a slot 51 formed in the lower threaded end of the tie bar 22, as illustrated in FIG. 5. The threaded washer 40 threads on the lower threaded end of the tie bar while the lock washers are unthreaded. It will be appreciated that by threading the tie bar into and out of the end plug 32, the length of the water rod assembly can be adjusted. For example, to shorten the water rod assembly, the, threaded washer 40 is first rotated upwardly sufficiently to remove the lower axially projecting portion 46 of the lock washer 42 from engagement in one of the slots 34 of the end plug 32. The tie bar can then be screwed into the upper water rod end plug and the threaded washer rotated to again bear against the lower lock washer with the tab 46, in one of slots 34. To lengthen the water rod assembly, the reverse procedure is utilized.

Referring to FIG. 4, it will be appreciated that the head at the upper end of each tie bar has a D-flat configuration, i.e., the flat appearing at 50. Similarly, the lock washer 40 has a D-flat configuration. As noted previously, to adjust the length of the tabbed water rod assembly 14, the water rod 20 must be within one turn of bottoming out on the lower tie plate 12 and the tabs 30 and D-flat orientation must be maintained in a predetermined direction. A tool kit is provided in accordance with the present invention to effect the adjustment in length of the water rod assemblies and to verify and maintain the correct orientation of the assemblies after fabrication and during handling.

Figure 6:
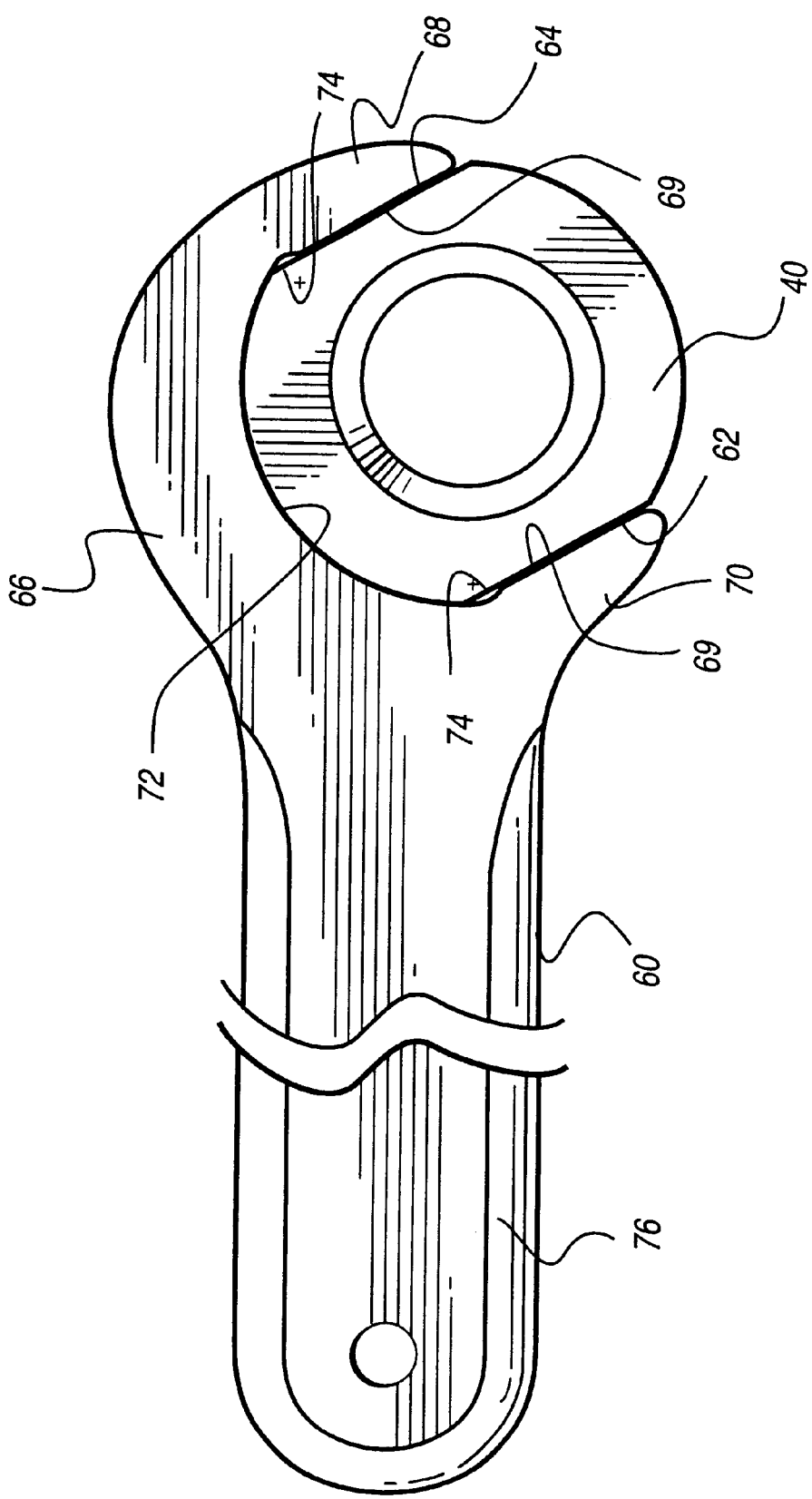
FIG. 6 is a fragmentary plan view illustrating a D-flat head on the end of the tie bar and a wrench forming part of the tool kit according to the present invention.
Figure 14:
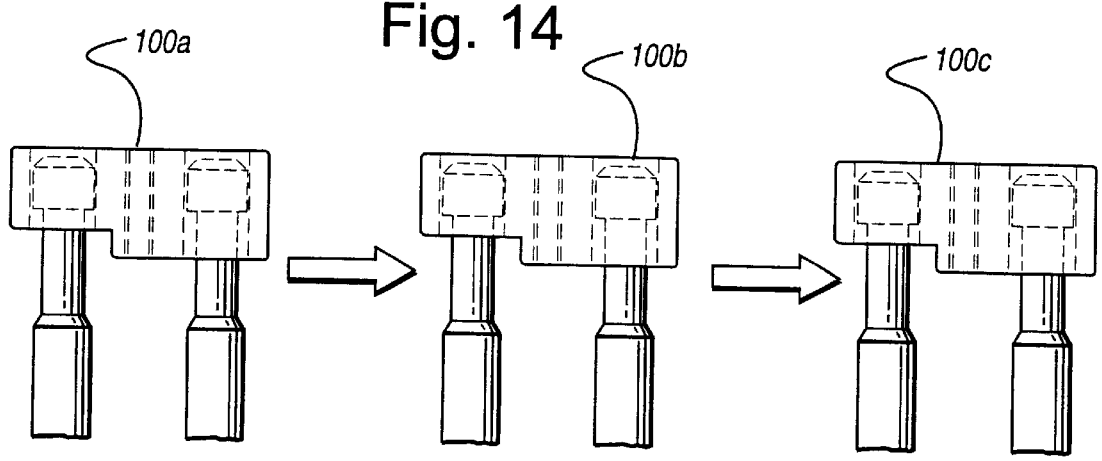
FIG. 14 is a schematic illustration of the application of orientator gauges of different sizes applied to sequentially the upper ends of the tie bars.
Figure 15:
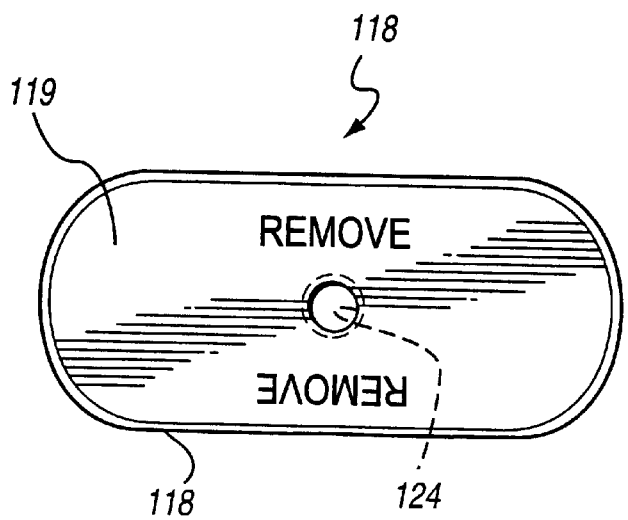
FIGS. 15, 16 and 17 are top plan, side elevational and bottom plan views of an orientator cap.
Figure 16:
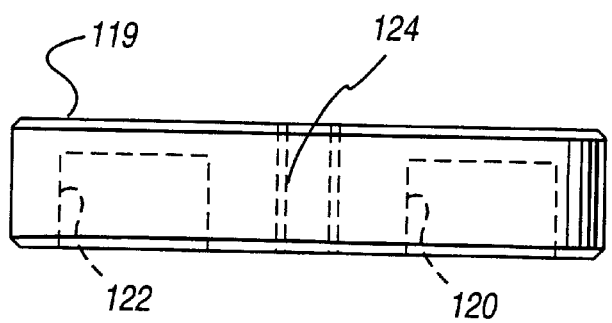
Figure 17:
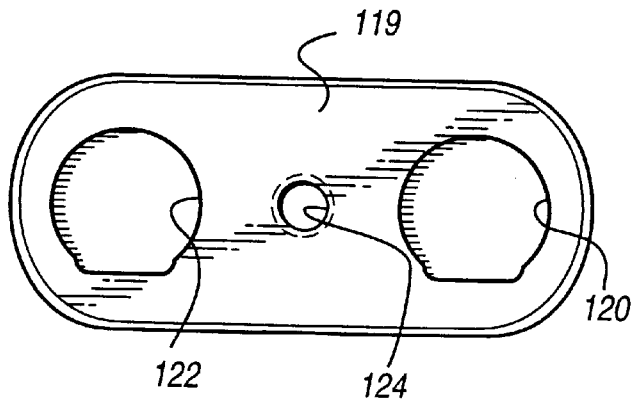

To accomplish this, there is provided a tool kit comprised of a wrench for applying to the threaded washer (FIG. 6), a socket (FIGS. 7–9), orientator wrenches (FIG. 10), orientator gauges (FIGS. 11–14), and an orientator cap (FIGS. 15–17). Referring to FIG. 6, there is illustrated the threaded washer wrench 60 for engaging about the threaded washer 40 of the releasable locking subassembly 23 in FIG. 2. It will be appreciated from a review of FIG. 6 that the threaded washer 40 has a pair of flats 62 and 64 on opposite sides thereof. The threaded washer wrench 60 includes a head 66 having a pair of jaws 68 and 70 opposite one another defining an opening therebetween with opposed parallel surfaces 69 and a base 72 along the side of the opening. Significantly, the juncture between each of the jaws 68 and 70 and the base 72 is provided with a relief 74. The purpose of the relief is to prevent the rounding off of the corners of the juncture of the flats 62 and 64 and the arcuate areas of the threaded washer 40 between those flats. The wrench 60 also includes an elongated handle 76.

Referring now to FIGS. 7–9, the socket 80 includes a generally cylindrical socket body 82 having a recess 84 opening through one end of the body. As illustrated in FIG. 9, the recess 84 has a cross-sectional shape generally complementary to the cross-sectional shape of the heads 26 and 28 at the upper ends of the tie bars 22 and 24. As illustrated, the heads 26 and 28 have a single flat. Accordingly, the recess 84 of the socket 80 has a corresponding flat 86. On the opposite end of the socket body 82 in FIG. 9 is a socket head 87 having an aperture 88. The socket head 87 and socket body 82 are suitably secured to one another. The aperture 88 is preferably multi-sided, e.g., in this instance, square, to receive a complementary-shaped shank of a tool driver. Thus, with the socket 80 applied over the heads 26 and 28, the tool driver when engaged in the square opening 88, can rotate the tie bars.

Figure 10:
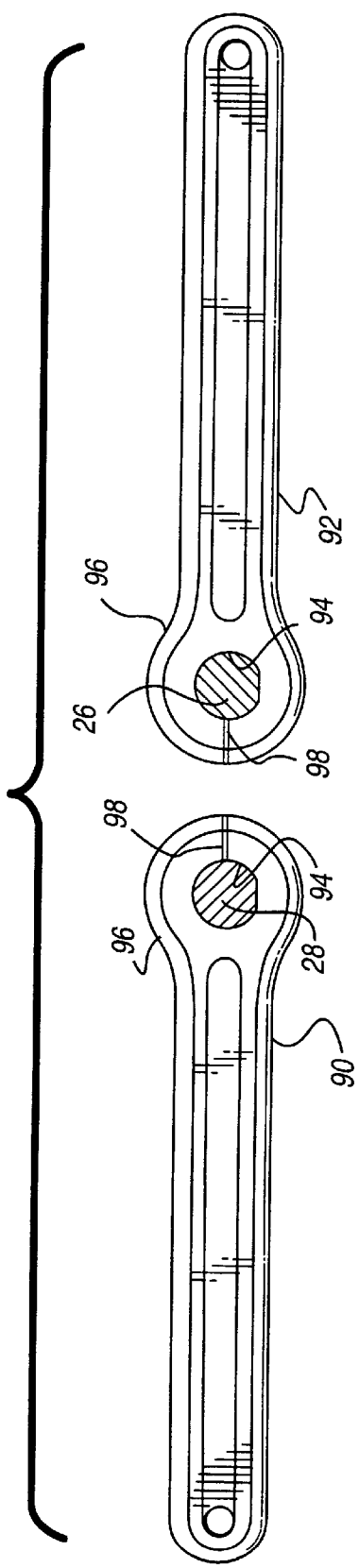
FIG. 10 is a cross-sectional view through the D-flats at the upper end of the tie rods illustrating a pair of orientator wrenches about the D-flats.

Referring to FIG. 10, there is illustrated a pair of orientator wrenches 90 and 92. Each wrench has an opening 94 adjacent an enlarged head 96 at one end of the wrench whereby the wrench can be applied to the heads 26 and 28 of the tie bars. Additionally, each head has a witness notch 98. The witness notch is generally a V-shaped notch formed in the middle of the wrench head 96. The wrenches 90 and 92 are utilized in maintaining the D-flats on the heads of the tie bars in proper orientation. By aligning the wrenches generally parallel to one another and aligning the witness notches 98 with one another, it will be appreciated that the D-flats are located on predetermined sides of the wrenches in a generally common plane as illustrated in FIG. 10.

Figure 12:
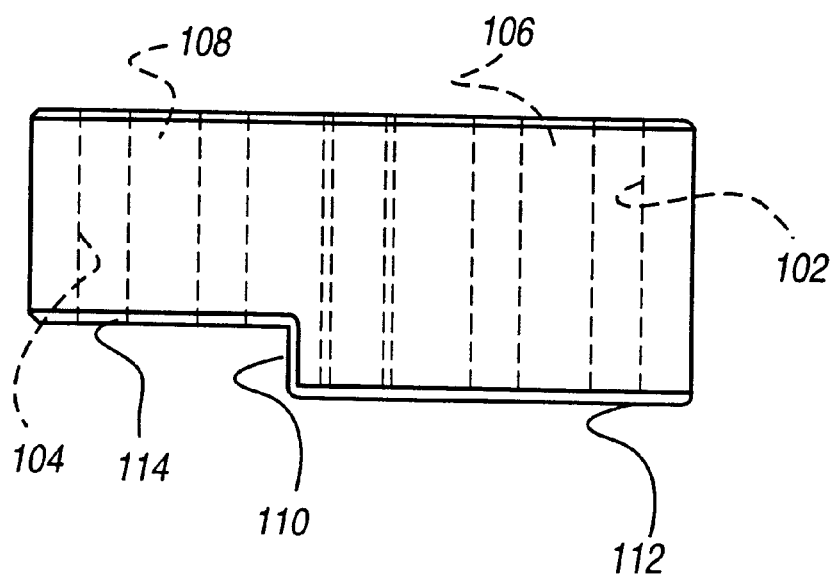
Figure 13:
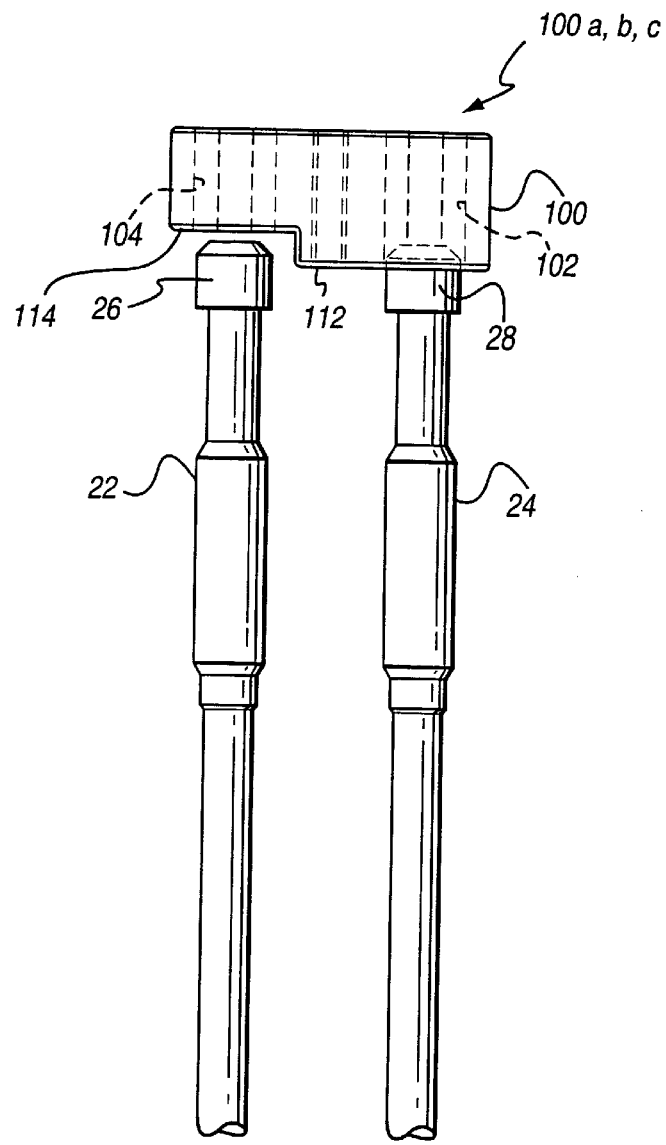
FIG. 13 is a schematic illustration of the application of an orientator gauge applied to the upper ends of tie bars.

Referring now to FIGS. 11–14, there are provided orientator gauges 100a, b and c (FIG. 14). Each gauge 100a, b or c comprises a gauge body 101 having a pair of openings 102 and 104. The gauges are similar to one another with the exception that the openings 102 and 104 of one gauge are reduced in size relative to the size of the openings of the other gauges. In a preferred embodiment of the present invention, there are provided three gauges wherein the size of the openings 102 and 104 are progressively reduced from a maximum to a nominal and then to a minimum size, respectively. The openings 102 and 104 in each gauge are, however, identical in orientation relative to one another, i.e., the D-flats 106 and 108 lie in a common plane. The gauge openings 102 and 104 are spaced one from the other corresponding to the spacing between the tie bars 22 and 24.

Figure 11:
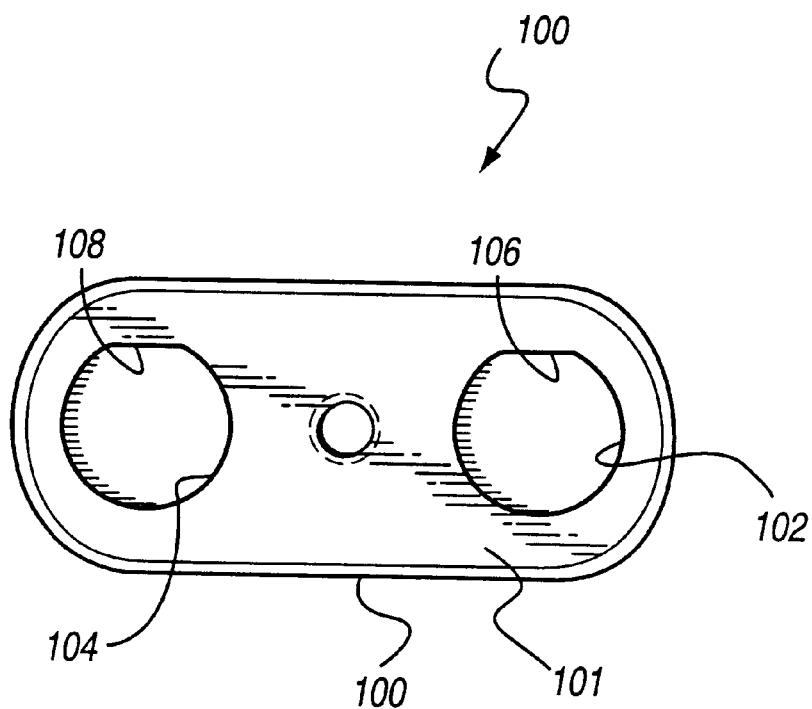
FIGS. 11 and 12 are top plan and side elevational views respectively of one of the fabrication gauges.

The openings are also shaped complementary to the shapes of the heads 26 and 28 of the tie bar. In a preferred embodiment, it will be appreciated that the openings 102 and 104 have single flats 106 and 108, respectively, aligned with one another as illustrated in FIG. 11, i.e., in a common plane. As best illustrated in FIG. 12, the openings have axes parallel to one another. However, the body of each gauge 100a, b and c is stepped at 110 such that the margin 112 defining the entrance to opening 102 is axially offset from the margin 114 defining the entrance to the opening 104.

Each of the maximum, nominal and minimum gauges 100a, 100b and 100c, respectively (FIG. 14), are applied in sequence to the heads 26 and 28 of the tie bars 22 and 24 in FIG. 13. Thus, once the heads of the tie bars are oriented by the orientator wrenches illustrated in FIG. 10, gauges 100a, 100b and 100c are sequentially applied to the heads to orient the heads within predetermined tolerances. For example, the maximum orientator gauge 100a is first applied to the heads 26 and 28 in FIG. 13. If the heads are not properly oriented, the gauge is applied such that opening 102 engages one of the heads. The engaged head and hence the associated tie bar can then be displaced or rotated a very limited distance about the axis of the engaged tie bar such that the adjoining head can be disposed in the opening 104. That is, with the head in the opening 102, and the head of the adjoining tie bar spaced from the margin 114 of opening 104, the gauge can be displaced, i.e., rotated, to ensure alignment of the opening 104 with the head of the adjacent tie bar followed by the insertion of both heads through the openings. Upon removal of the maximum gauge 100a, a nominal gauge 100b can be applied similarly to the heads followed by a similarly applied minimum gauge 100c. Gauge 100c provides the desired orientation of the heads. With the water rod assemblies in the desired orientation and adjusted length, the fuel bundle is ready for shipment. It will be appreciated that use of one of the gauges 100a, 100b or 100c could be omitted or that additional gauges of different sizes can be used.

To ensure that the orientation is maintained during shipment, an orientation cap 118 (FIGS. 15–17) is provided. The orientation cap has a cap body 119 including a pair of openings 120 and 122 through one side of the body. The openings 120 and 122 correspond in shape to the shape of the heads 26 and 28 of the tie bars 22 and 24, i.e., they have a D-flat orientation. With the cap 118 inserted onto the heads of the tie bars, it will be appreciated that the tie bars are prevented from rotation, for example, during shipping. The cap 118 is also provided with a central threaded opening 124 for securing the cap to the fuel bundle or to assist in the removal of the orientating cap from the tie bar heads 26 and 28.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tool kit for ensuring rotational orientation of a pair of tie bars having flats adjacent upper ends thereof wherein the tie bars form part of a water rod assembly in a nuclear fuel bundle, the water rod assembly including a pair of water rods, the pair of tie bars and pair of water rods having releasable locking subassemblies for respectively securing the tie bars and water rods to one another forming joints therebetween, comprising:

first and second gauges each having a gauge body with first and second openings generally complementary in shape to the respective upper ends of the tie bars having said flats, said openings having parallel axes, margins of each gauge body defining the openings being offset from one another in the direction of said axes, the openings of the second gauge being reduced in diameter relative to the openings in the first gauge body whereby the rotational orientation of the water rods about their respective axes is ensured upon application of the first and second gauges to the tie bars.

2. A tool kit according to claim 1 including a third gauge having a gauge body with first and second openings generally complementary in shape to the respective upper ends of the tie bars having flats, said openings of said third gauge having parallel axes and being reduced relative to the openings in the first and second gauge bodies, margins of the third gauge body defining the openings being offset from one another in the direction of the axes whereby rotational orientation of the water rods about their respective axes is adjustable.

3. A tool kit for adjusting rotational orientation of a pair of tie bars having flats adjacent upper ends thereof wherein the tie bars form part of a water rod assembly in a nuclear fuel bundle, the water rod assembly including a pair of water rods, the pair of tie bars and pair of water rods having releasable locking subassemblies for respectively securing the tie bars and water rods to one another forming joints therebetween, comprising:

a pair of wrenches having wrench heads including openings respectively complementary in shape to the flats at the upper ends of the tie bars and reference points on the wrench heads for alignment with one another upon engagement of the tie bar upper ends in the wrench head openings to align the water rods with one another rotationally about their respective axes; and at least one gauge having a gauge body with first and second openings generally complementary in shape to the respective upper ends of the tie bars having said flats, said openings having parallel axes, margins of the gauge body defining the openings being offset from one another in the direction of said axes whereby rotational orientation of the water rods about their respective axes is adjusted upon application of the one gauge to said tie bars.

4. A tool kit according to claim 3 including a second gauge having a gauge body with first and second openings generally complementary in shape to the respective upper ends of the tie bars having the flats, said openings of said second gauge having parallel axes and being reduced in diameter relative to the openings in the first gauge body, margins of the second gauge body defining the openings being offset from one another in the direction of the axes whereby rotational orientation of the water rods about their respective axes is adjustable.

5. A tool kit according to claim 4 including a third gauge having a gauge body with first and second openings generally complementary in shape to the respective upper ends of the tie bars having the flats, said openings of said third gauge having parallel axes and being reduced in diameter relative to the openings in the second gauge body, margins of the third gauge body defining the openings being offset from one another in the direction of the axes whereby rotational orientation of the water rods about their respective axes is adjustable.

6. A took kit according to claim 3 including a cap having a cap body with first and second openings generally complementary in shape to the respective upper ends of the tie bars for maintaining orientation of the water rod assemblies about their axes during handling of the fuel bundle.

7. A tool kit according to claim 3 wherein said locking subassembly includes a threaded washer having a pair of flats, and including a wrench having an opening substantially complementary in shape to the threaded washer with flats including a head having a pair of opposing jaws, a base between said jaws at one end of said opening, the junctures between said jaws and said base having reliefs for precluding rounding off corners of the threaded washer.

8. A tool kit according to claim 3 including a socket having a recess complementary in shape with the shape of the flats at the upper ends of the tie bars and opening through one end of the socket for receiving the tie bar upper ends within said recess and a square aperture at its opposite end for receiving the driver of a driving tool whereby, with the socket recess received about the tie rod ends, the tie rods and/or water rods are rotatable by rotation of the socket.

9. A tool kit according to claim 3 including a second gauge having a gauge body with first and second openings generally complementary in shape to the respective upper ends of the tie bars having the flats, said openings of said second gauge having parallel axes and being reduced in diameter relative to the openings in the first gauge body, margins of the second gauge body defining the openings being offset from one another in the direction of the axes whereby rotational orientation of the water rods about their respective axes is adjustable, and a cap having a cap body with first and second openings generally complementary in shape to the respective upper ends of the tie bars for adjusting orientation of the water rod assemblies about their axes during handling of the fuel bundle.

10. A tool kit according to claim 3 including a second gauge having a gauge body with first and second openings generally complementary in shape to the respective upper ends of the tie bars having the flats, said openings of said second gauge having parallel axes and being reduced in diameter relative to the openings in the first gauge body, margins of the second gauge body defining the openings being offset from one another in the direction of the axes whereby rotational orientation of the water rods about their respective axes is adjustable, each said locking subassembly including a threaded washer having a pair of flats, and including a wrench having an opening substantially complementary in shape to the threaded washer with flats including a head having a pair of opposing jaws, a base between said jaws at one end of said opening, the juncture between said jaws and said base having reliefs for precluding rounding off corners of the threaded washer.

11. A tool kit according to claim 3 including a second gauge having a gauge body with first and second openings generally complementary in shape to the respective upper ends of the tie bars having the flats, said openings of said second gauge having parallel axes and being reduced in diameter relative to the openings in the first gauge body, margins of the second gauge body defining the openings being offset from one another in the direction of the axes whereby rotational orientation of the water rods about their respective axes is adjustable, and a socket having a recess complementary in shape with the shape of the flats at the upper ends of the tie bars and opening through one end of the socket for receiving the tie bar upper ends within said recess and a square aperture at its opposite end for receiving the driver of a driving tool whereby, with the socket recess received about the tie rod ends, the tie rods and/or water rods are rotatable by rotation of the socket.

12. A tool kit according to claim 3 including a second gauge having a gauge body with first and second openings generally complementary in shape to the respective upper ends of the tie bars having the flats, said openings of said second gauge having parallel axes and being reduced in diameter relative to the openings in the first gauge body, margins of the second gauge body defining the openings being offset from one another in the direction of the axes, a third gauge having a gauge body with first and second openings generally complementary in shape to the respective upper ends of the tie bars having the flats, said openings of said third gauge having parallel axes and being reduced in diameter relative to the openings in the second gauge body, margins of the third gauge body defining the openings being offset from one another in the direction of the axes whereby rotational orientation of the water rods about their respective axes is adjustable, and a cap having a cap body with first and second openings generally complementary in shape to the respective upper ends of the tie bars for maintaining orientation of the water rod assemblies about their axes during handling of the fuel bundle.

13. A tool kit according to claim 3 including a second gauge having a gauge body with first and second openings generally complementary in shape to the respective upper ends of the tie bars having the flats, said openings of said second gauge having parallel axes and being reduced in diameter relative to the openings in the first gauge body, margins of the second gauge body defining the openings being offset from one another in the direction of the axes whereby angular orientation of the water rods about their respective axes is adjustable, a third gauge having a gauge body with first and second openings generally complementary in shape to the respective upper ends of the tie bars having the flats, said openings of said third gauge having parallel axes and being reduced in diameter relative to the openings in the second gauge body, margins of the third gauge body defining the openings being offset from one another in the direction of the axes whereby rotational orientation of the water rods about their respective axes is adjustable, said locking subassembly including a threaded washer having a pair of flats, and a wrench having an opening substantially complementary in shape to the threaded washer with the flats including a head having a pair of opposing jaws, a base between said jaws at one end of said opening, the juncture between said jaws and said base having reliefs for precluding rounding off corners of the threaded washer.

14. A tool kit according to claim 3 including a second gauge having a gauge body with first and second openings generally complementary in shape to the respective upper ends of the tie bars having the flats, said openings of said second gauge having parallel axes and being reduced in diameter relative to the openings in the first gauge body, margins of the second gauge body defining the openings being offset from one another in the direction of the axes whereby rotational orientation of the water rods about their respective axes is adjustable, a third gauge having a gauge body with first and second openings generally complementary in shape to the respective upper ends of the tie bars having the flats, said openings of said third gauge having parallel axes and being reduced in diameter relative to the openings in the second gauge body, margins of the third gauge body defining the openings being offset from one another in the direction of the axes whereby rotational orientation of the water rods about their respective axes is adjustable and a socket having a recess complementary in shape with the shape of the flats at the upper ends of the tie bars and opening through one end of the socket for receiving the tie bar upper ends within said recess and a square aperture at its opposite end for receiving the driver of a driving tool whereby, with the socket recess received about the tie rod ends, the tie rods and/or water rods are rotatable by rotation of the socket.

15. A tool kit according to claim 3 including a cap having a cap body with first and second openings generally complementary in shape to the respective upper ends of the tie bars for maintaining orientation of the water rod assemblies about their axes during handling of the fuel bundle, said locking subassembly including a threaded washer having a pair of flats, and a wrench having an opening substantially complementary in shape to the threaded washer with flats including a head having a pair of opposing jaws, a base between said jaws at one end of said opening, the juncture between said jaws and said base having reliefs for precluding rounding off corners of the threaded washer.

16. A tool kit according to claim 3 wherein said locking subassembly includes a threaded washer having a pair of flats, and including a wrench having an opening substantially complementary in shape to the threaded washer with flats including a head having a pair of opposing jaws, a base between said jaws at one end of said opening, the juncture between said jaws and said base having reliefs for precluding rounding off corners of the threaded washer, a socket having a recess complementary in shape with the shape of the flats at the upper ends of the tie bars and opening through one end of the socket for receiving the tie bar upper ends within said recess and a square aperture at its opposite end for receiving the driver of a driving tool whereby, with the socket recess received about the tie rod ends, the tie rods and/or water rods are rotatable by rotation of the socket.

17. A tool kit according to claim 1 wherein said axially offset margin about a first opening of said first gauge enables rotation of said first gauge and a tie bar received in a second opening of said first gauge relative to another of said tie bars to a rotational position axially aligning said first opening of said first gauge with said another tie bar.

18. A tool kit according to claim 17 wherein said axially offset margin about a first opening of said second gauge enables rotation of said second gauge and a tie bar received in a second opening of said second gauge relative to another of said tie bars to a rotational position axially aligning said first opening of said second gauge with said another tie bar.

19. A tool kit according to claim 3 wherein said axially offset margin about a first opening of said one gauge enables rotation of said one gauge and a tie bar received in a second opening of said one gauge relative to another of said tie bars to a rotatable position axially aligning said first opening of said one gauge with said another tie bar.

20. In a nuclear fuel bundle including tie bars with flats adjacent upper ends thereof forming part of a water rod assembly having a pair of water rods, the pair of tie bars and pair of water rods having releasable locking assemblies for respectively securing the tie bars and water rods to one another forming joints therebetween, a method for ensuring rotational orientation of the respective tie bars and water rods relative to one another, comprising the steps of:

providing first and second gauges each having a gauge body with first and second openings generally complementary in shape to the respective upper ends of the tie bars having the flats;

providing margins for each gauge body defining the openings axially offset from one another in the direction of said axes;

providing openings in the second gauge of reduced diameter relative to the openings in the first gauge; and successively applying the first and second gauges to the upper ends of the tie bars to ensure rotational orientation of the water rods about their respective axes.

21. In a nuclear fuel bundle including tie bars with flats adjacent upper ends thereof forming part of a water rod assembly having a pair of water rods, the pair of tie bars and pair of water rods having releasable locking assemblies for respectively securing the tie bars and water rods to one another forming joints therebetween, a method for ensuring rotational orientation of the tie bars and water rods, respectively, relative to one another, comprising the steps of:

providing a pair of wrenches having wrench heads including openings respectively complementary in shape to the flats at the upper ends of the tie bars with reference points on the wrench heads;

applying the pair of wrenches to the upper ends of the tie bars and aligning the reference points on the wrench heads with one another to align the water rods with one another rotationally about their respective axes;

providing at least one gauge with first and second openings generally complementary in shape to the respective upper ends of the tie bars having said flats, with margins of the openings being axially offset from one another in the direction of the axes; and adjusting the rotational orientation of the water rods relative to one another by applying the one gauge to the upper ends of the tie rods having the flats.

22. A method according to claim 21 including providing a second gauge having a gauge body with first and second openings generally complementary in shape to the respective upper ends of the tie bars having the flats, providing said openings of the second gauge with reduced diameters relative to the openings of the first gauge body with margins of the second gauge body defining the openings being offset from one another in the direction of the axes; and applying the second gauge to the upper ends of the tie bars with the flats to adjust the angular orientation of the respective water rod assemblies relative to one another about their axes.

23. A method according to claim 21 including providing a cap having a cap body with first and second openings generally complementary in shape to the respective upper ends of the tie bars and applying the cap body to the upper ends of the tie bars for maintaining orientation of the water rod assemblies about their axes during handling of the fuel bundle.

\* \* \* \* \*